Sept. 3, 1946. J. K. HOLBROOK 2,407,009
MICROFILM VIEWER
Filed Aug. 16, 1943 2 Sheets-Sheet 1
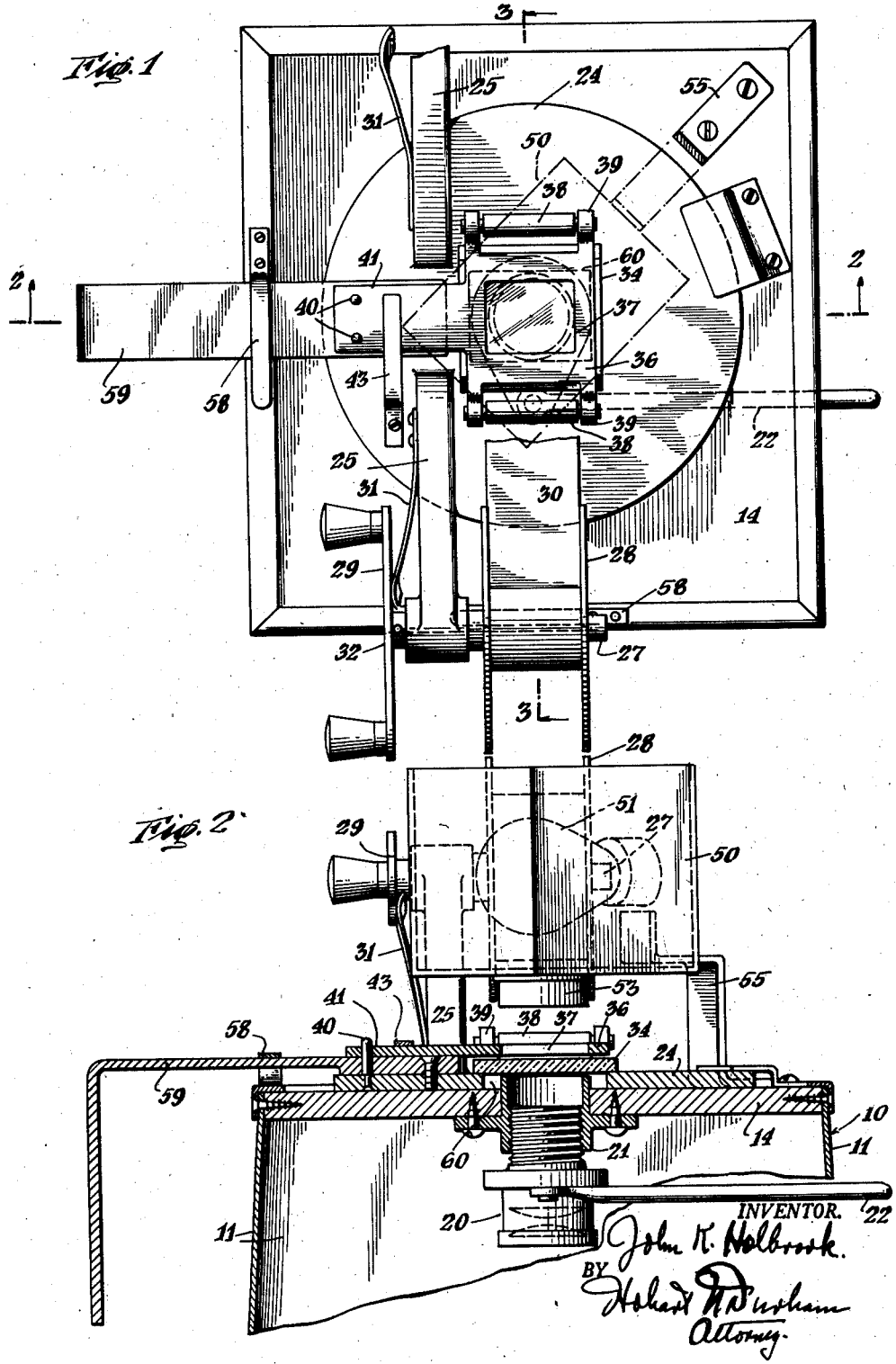

Sept. 3, 1946.  J. K. HOLBROOK  2,407,009
MICROFILM VIEWER
Filed Aug. 16, 1943  2 Sheets-Sheet 2
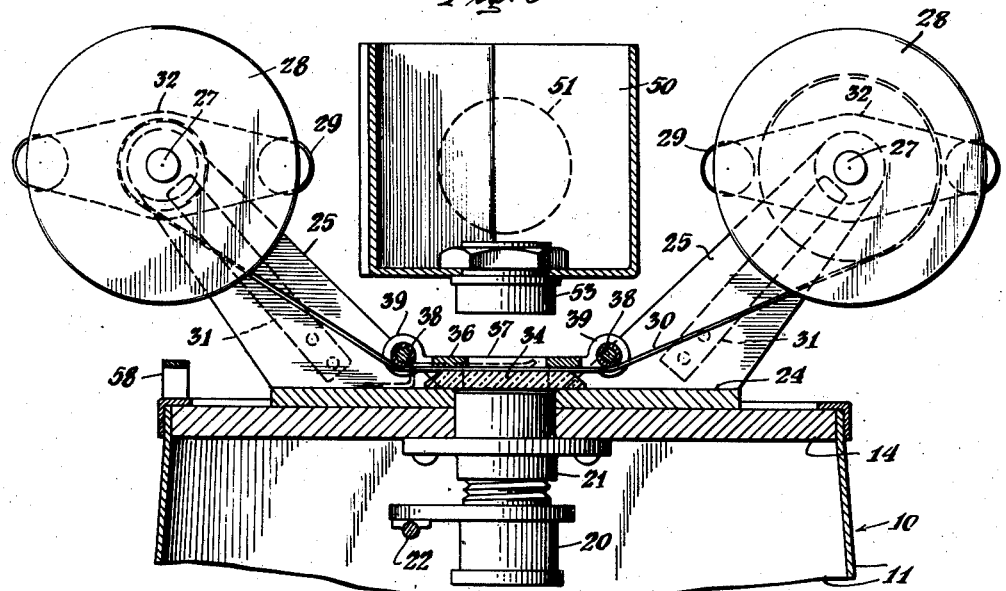
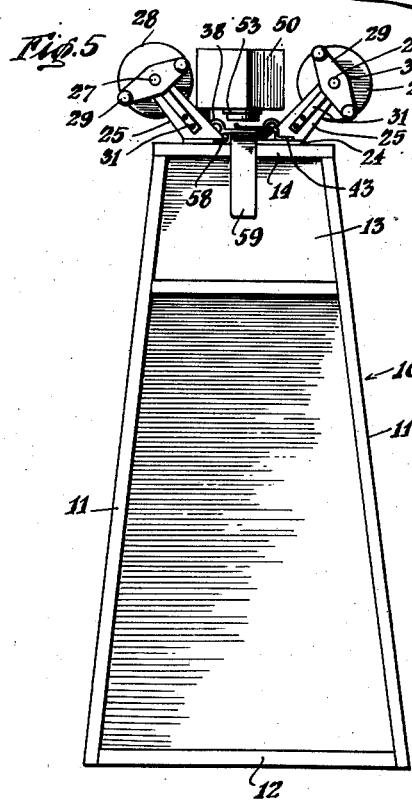
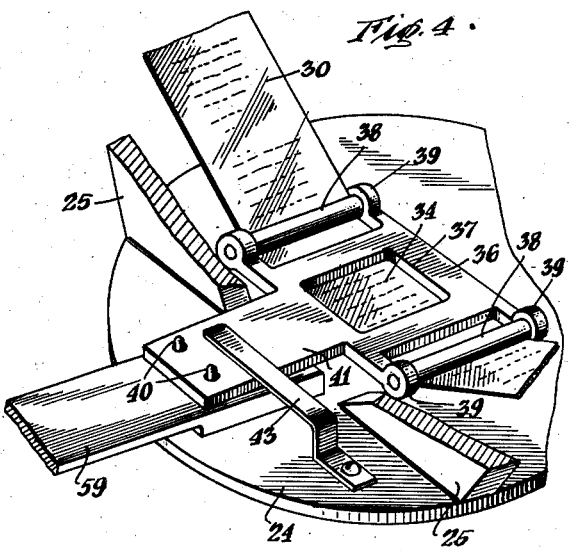
INVENTOR.
John K. Holbrook.
BY
Hobart N. Durham
Attorney.

Patented Sept. 3, 1946

2,407,009

UNITED STATES PATENT OFFICE 2,407,009

MICROFILM VIEWER

John K. Holbrook, New York, N. Y., assignor to Micropat, Inc., New York, N. Y., a corporation of Delaware Application August 16, 1943, Serial No. 498,804

3 Claims. (Cl. 88—24)

The present invention relates to new and useful improvements in micro-film viewers or projectors.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a top plan view of the upper portion of a typical and illustrative embodiment of the invention, with certain parts being broken away;

Figure 2 is a fragmentary vertical section taken on the line 2—2 of Figure 1;

Figure 3 is a fragmentary sectional view taken on the line 3—3 of Figure 1;

Figure 4 is a fragmentary perspective view of the upper portion of the viewer shown in the preceding views, with certain parts omitted and others broken away; and Figure 5 is a side elevation of the micro-film viewer shown in more detail in Figures 1 to 4.

The present invention has for its object the provision of a novel and improved viewer or projector particularly adapted for the convenient and rapid viewing of micro-film reproductions of newspapers, books, documents or other material. Another object of the invention is the provision of an improved micro-film viewer having means for laterally and longitudinally moving a film strip so that it may be correctly positioned on a viewing screen for easy viewing. The invention further provides a micro-film view in which means are provided for automatically moving the film into and out of the focal plane of the projecting lens and into and out of contact with a pressure plate, so that as the film is rapidly advanced along its length the film is lifted out of contact with the pressure plate, thereby avoiding scratching of the film and prolonging its useful life. Still another object of the invention is the provision of an improved micro-film viewer or projector in which the film gate and film reels are rotatably mounted about the lens axis so that the film may be viewed in either direction depending on whether the reproductions are positioned along or across the film.

In accordance with the present preferred and illustrative embodiment of the invention, there is provided a light excluding cabinet at the bottom of which is mounted a viewing screen, while at the top, and within easy reach of the person viewing the projected image on the screen, is mounted a projector and film feeding unit comprising a lamp house, film supply and take up reels, film gate, pressure plate and focusing projection lens, all arranged to project a selected portion of the film onto the viewing screen in greatly magnified size so that the text or other matter on the film may be easily read. Means are provided for rapidly and conveniently moving the film longitudinally until the desired portion of the roll of film has been reached, with the film automatically lifted out of contact with the transparent pressure plate which remains fixed in the focal plane of the lens, and for automatically pressing the film into contact with the pressure plate, thereby returning the film automatically into properly focused relation with respect to the lens when the film has been moved to the correct position, and also insuring that the film will not be scratched by rubbing over the surface of the pressure plate while the film is being rapidly fed to the selected portion. Means are also provided for shifting the projector unit transversely of the film so that either side edge of the film may be viewed, it being desirable from the point of view of compactness that the degree of enlargement or magnification of the film provided by the projection lens and the distance of the lens from the screen be greater than can be accommodated by a compact screen. Thus the apparatus provides a compact viewing apparatus, which can be produced relatively inexpensively and gives a reasonably high degree of enlargement so that the text is easily read. Means are also provided whereby portions of the projector unit at the top of the viewer may be rotated about the lens axis so that regardless of the position of the lines of text matter on the film, these lines may be viewed in a consistent position.

It will be understood that the foregoing general description and the following detailed description as well are exemplary and explanatory of the invention but are not restrictive thereof.

Referring now in detail to the preferred and illustrative embodiment of the invention as shown in the drawings, there is provided a light excluding cabinet 10 having opaque back and side walls 11 and an open front, the sides being shaped generally to form a truncated pyramid and securely held together so that the cabinet sides form a rigid support for the projector unit supported on the upper portion of the cabinet. The bottom of the cabinet is formed as an opaque, preferably white, projection screen 12 onto which the enlarged image is projected by the projector unit, and from which the stray light of the ordinary room is shielded by means of the opaque back and side walls 11, while the screen is unobstructedly viewed through the front of the cabinet below the short front apron 13.

The top of the cabinet is formed as a flat wall 14 on which the projector unit is removably and rotatably mounted, the wall 14 preferably being horizontal and substantially parallel to the screen, while the projector has its axis substantially vertical.

The projector unit lens 20 is screw-threaded into a flange 21 projecting downwardly from the top wall 14 and is pivotally connected to a push rod 22 which projects through a side wall 11 so that the lens may be rotated for focusing. Above the lens and mounted on the top wall 14 is a rotatable plate 24 carrying the film gate, film reel supports, film advancing means, transparent pressure plate, film gate and other parts of the projector unit. As embodied, there are provided a pair of divergent film reel supporting arms 25 at the upper end of which are rotatably journalled parallel spindles 27 adapted to receive and rotatably support two film reels 28 which fit snugly to the spindles so that either reel may be turned by rotation of its spindle. Each spindle is provided with a crank 29 by which it may be rotated, and to provide a slight amount of tension on the film 30 as it is wound from one reel to the other, a leaf spring 31 is provided on each arm, bearing against the enlarged central portion 32 of the crank 29.

Immediately above the lens is mounted a flat piece of transparent glass 34, somewhat larger than the area of the film to be projected, the upper portion of the glass pressure plate 34 lying in the normal focal plane of the lens 20. Over the glass pressure plate 34 is provided a film gate 36 having an aperture 37 corresponding to the area of the film to be projected, and provided at either side of the pressure plate with a small roller 38 which is rotatably journalled in small lugs 39 formed as a part of the film gate. The film gate is supported and located in proper position by means of a pair of pins 40 projecting upwardly from the plate 24 and passing loosely through spaced apertures in an arm 41 extending from one side of the gate member 36. Thereby, the gate may move up and down with respect to the pressure plate 34 and is pressed lightly towards the pressure plate 34 by means of a leaf spring 43 fastened to plate 24 and resting on the arm 41.

Rollers 38 are preferably parallel to each other and are so related to the under side of the gate member 36 that when when slight tension is applied to the film as it is passed under both rollers 38 and the gate 36, the film is held clear of the gate and rotates the rollers 38 without sliding over any of the members. The tension of the leaf springs 31 is sufficiently heavy with respect to the strength of spring 43 that the drag on the unwinding film causes the gate 36 to be lifted until the film, usually its emulsion side, is lifted clear of the glass pressure plate 34, thereby completely avoiding contact of the film with the glass during movement of the film.

As soon as the film feeding operation is stopped, the slack in the film, either due to the overrun of the supply reel, or to a slight backward rotation of the take up reel as the crank as one's hand lets go of it, allows the spring 43 to return the film accurately to the focal plane in contact with the upper face of the glass pressure plate 34.

Above the film gate is mounted a suitable light source comprising a lamp house 50 having a concentrated filament lamp 51 therein supplied with power through conductors (not shown), and condenser lenses 53, all of which are held in proper position with respect to the film and lens by means of a bracket 55 secured to the upper wall 14 near one corner thereof, so that the properly focused rays of light from the lamp 51 are projected onto the film at the aperture 37 in the film gate 36.

For rotating the film about the axis of the lens 20 so that the lines of text may be brought into the desired position, plate 24 is preferably circular and is rotatable on the upper wall 14, being held thereagainst by means of the bent leaf springs 58 which are fastened to the upper wall 14 and press lightly against the upper face of the plate 24. Plate 24 is formed with a radially and downwardly extending arm 59 by which it may be rotated 90°.

In order to render the apparatus as compact as possible the screen at the bottom of the cabinet is preferably square, although the standard image size on 35 mm. film is about 18 mm. by 24 mm. and even larger image areas may be used where the film is unperforated. For ease of reading, a large degree of magnification is generally used, and is advisable, but requires that the film be shiftable transversely of its length, as well as longitudinally.

To provide for rapid, accurate location of the desired portion of the image with respect to the screen, and also to guide the rotation of the film feeding means as the position of the lines is shifted by rotation of the plate 24, the upper end of the lens supporting flange 21 extends slightly through the upper wall 14 of the cabinet and into an elongated slot 60 in plate 24. Slot 60 is of a width corresponding to the outside diameter of flange 21, and is of somewhat greater length the longer portion of the slot extending transversely of the film, and thereby permitting the plate 24 and film to be shifted by pushing or pulling on arm 59 until the desired position of the film in gate aperture 37 is projected onto the screen.

When it is desired to remove the film feeding means, pressure plate 34 or gate 36 for cleaning, the arm 59 may be swung to an intermediate position, and plate 24 may then be lifted enough to clear the upper end of the flange 21 so that the plate and its supported parts may be slid out beneath the lamp house 50.

The film reels may be replaced when the film has been completely wound onto one reel 28 or the other by removing the full reel and substituting another, which may then be threaded onto the take up reel after its end has been led under the film gate member 36.

The invention in its broader aspects is not limited to the specific mechanisms shown and described but departures may be made therefrom within the scope of the accompanying claims without departing from the principles of the invention and without sacrificing its chief advantages.

What I claim is:

1. A micro-film viewer including in combination a lens mount, a plate having an elongated slot pivotally and laterally movable on said mount, a pressure plate alined with the lens axis, an apertured member above and resiliently urged towards said plate, means for leading the film towards and away from said pressure plate and between said pressure plate and member whereby tension on the film lifts the member and film from the pressure plate, said slotted plate having the pressure plate, member and film leading means secured to it whereby movement of the slotted plate similarly moves the film relatively to the lens.

2. A micro-film viewer including in combination a lens mount, a plate having an elongated slot pivotally and laterally movable on said mount, a pressure plate alined with the lens axis, an apertured member above and resiliently urged towards said plate, means for leading the film towards and away from said pressure plate and between said pressure plate and member including a pair of braked film reels mounted on said slotted plate above said apertured member whereby tension on the film lifts the member and film from the pressure plate, said slotted plate having the pressure plate, member and film leading means secured to it whereby movement of the slotted plate similarly moves the film relatively to the lens.

3. A micro-film viewer including in combination a lens mount, a plate having an elongated slot pivotally and laterally movable on said mount, a pressure plate alined with the lens axis, an apertured member above and resiliently urged towards said plate, means for leading the film towards and away from said pressure plate and between said pressure plate and member including a pair of braked film reels mounted on said slotted plate above said apertured member whereby tension on the film lifts the member and film from the pressure plate, said slotted plate having the pressure plate, member and film leading means secured to it whereby movement of the slotted plate similarly moves the film relatively to the lens and a light source mounted above said slotted plate and separate therefrom in line with said apertured plate and lens.

JOHN K. HOLBROOK.